United States Patent
West, III

(10) Patent No.: US 9,054,970 B2
(45) Date of Patent: *Jun. 9, 2015

(54) METHOD AND APPARATUS FOR MEASURING THE END-TO-END PERFORMANCE AND CAPACITY OF COMPLEX NETWORK SERVICE

(71) Applicant: AT&T Intellectual Property I, LP, Atlanta, GA (US)

(72) Inventor: Earle H. West, III, Morganville, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 137 days.

This patent is subject to a terminal disclaimer.

(21) Appl. No.: 13/859,879

(22) Filed: Apr. 10, 2013

(65) Prior Publication Data

US 2013/0227134 A1 Aug. 29, 2013

Related U.S. Application Data

(63) Continuation of application No. 12/209,267, filed on Sep. 12, 2008, now Pat. No. 8,438,269.

(51) Int. Cl.
*G06F 15/173* (2006.01)
*H04L 12/26* (2006.01)

(52) U.S. Cl.
CPC ............ *H04L 43/0876* (2013.01); *H04L 43/10* (2013.01); *H04L 43/12* (2013.01)

(58) Field of Classification Search
USPC .................. 709/204, 201, 202, 203, 231, 236
See application file for complete search history.

(56) References Cited

U.S. PATENT DOCUMENTS

| | | | |
|---|---|---|---|
| 5,768,527 A | 6/1998 | Zhu et al. |
| 6,008,805 A | 12/1999 | Land et al. |
| 6,704,874 B1 | 3/2004 | Porras et al. |
| 7,222,190 B2 | 5/2007 | Klinker et al. |
| 7,254,781 B1 | 8/2007 | Land et al. |
| 7,310,684 B2 | 12/2007 | Patrick et al. |
| 7,447,762 B2 | 11/2008 | Curray et al. |
| 2002/0177448 A1 | 11/2002 | Moran et al. |
| 2003/0225549 A1 | 12/2003 | Shay et al. |
| 2004/0052259 A1 | 3/2004 | Garcia et al. |
| 2005/0235058 A1 | 10/2005 | Rackus et al. |
| 2007/0083639 A1 | 4/2007 | Gilbert et al. |
| 2007/0245391 A1 | 10/2007 | Pont |
| 2007/0256096 A1 | 11/2007 | Wilhelm |
| 2008/0002595 A1 | 1/2008 | Rao |

(Continued)

*Primary Examiner* — Lan-Dai T Truong
(74) *Attorney, Agent, or Firm* — Hoffmann & Baron, LLP

(57) ABSTRACT

A method and system of measuring performance and capacity of a network includes monitoring network activity using an application programming interfaces (API) monitoring system with a web services definition language (WSDL) file and a probe. The WSDL file provides instructions to a probe control system in the API monitoring system and the probe control system provides regular expressions to the probe. Performance data are collected using the probe. The performance data includes a collection of performance information. Using the probe, performance data are transmitted between the network and the API monitoring system. The API monitoring system stores the performance data in a database of performance data monitored and analyzes the performance data to determine performance and capacity of the network. The API monitoring system reports information on performance and capacity of the network to a network operations center dashboard.

20 Claims, 2 Drawing Sheets

(56) References Cited

U.S. PATENT DOCUMENTS

| | | |
|---|---|---|
| 2008/0034367 A1 | 2/2008 | Patrick et al. |
| 2008/0082613 A1 | 4/2008 | Szeto et al. |
| 2008/0082631 A1 | 4/2008 | Rajoo et al. |
| 2009/0321819 A1 | 12/2009 | Kagata et al. |
| 2009/0328119 A1 | 12/2009 | Kan et al. |
| 2010/0058343 A1 | 3/2010 | Kikuchi |

METHOD AND APPARATUS FOR MEASURING THE END-TO-END PERFORMANCE AND CAPACITY OF COMPLEX NETWORK SERVICE

CROSS REFERENCE TO RELATED APPLICATION

This application is a continuation of U.S. patent application Ser. No. 12/209,267 filed on Sep. 12, 2008, which is incorporated herein by reference in its entirety.

BACKGROUND OF THE INVENTION

1. Field of the Invention

The present invention relates to optimizing the capacity of a service path network. More particularly, it relates to a method and apparatus for dynamically configuring the monitoring of a Service Oriented Architecture (SOA), responsive to dynamically configured data monitoring, such that a new optimized service path network is calculated and the capacity of the system is maximized by real-time changes to the configuration of the network and execution of the service.

2. Brief Description of the Related Art

The present invention relates to the configuration of network service monitoring capabilities and the use of data from configured monitors to optimize the performance of service path networks. Network service monitoring capabilities are the capabilities of a system that directly measures and reports the volume and responsiveness of systems that provide one or more Application Programming Interfaces (APIs) to other systems. An API is a set of functions, procedures or classes that an operating system, library or service provides to support requests made by computer programs. A service path is generally defined as the connected sequence of network elements that together provide a particular service delivered to customers following the completion of provisioning activities. Service path APIs are APIs whose performance contributes directly to the performance, availability, and security of the service path. For example, a control message to implement a sports channel blackout on certain Internet Protocol Television (IPTV) set top boxes is one service path API that controls a network element in a television service.

The prior art teaches how one may directly monitor the performance of selected APIs and network elements that are combined into services. However, manual configuration of the monitoring system is required, and in large networks, this is tedious and time-consuming. More specifically, the prior art requires the manual preparation of "regular expressions" that programmatically describe filtering functions within a particular monitoring system as required to select particular APIs whose volume and performance directly bear on the performance of the service path. This monitoring configuration activity requires specialized skills and knowledge of methods to decode the APIs involved.

Consequently, in networks having a large number of component servers, the performance of the service path improves slowly over time, owing to the time-consuming, manual, work required to repeatedly adjust the monitoring capabilities targeting the many different network elements. As a consequence of the long time required to manually configure the many points that are monitored in a large service path network, the complete monitoring system cannot generally be configured quickly and the benefits of more rapid network optimization are lost.

Therefore, it would be advantageous to provide an API monitoring system whose configuration is automatically and mechanically controlled. It would be further advantageous to have such mechanical configuration responsive to both manual network change activity as well as dynamically-induced changes that are, in turn, responsive to network optimizations calculated from currently monitored performance data.

SUMMARY OF THE INVENTION

The present invention includes a method, apparatus, and computer readable medium for measuring performance and capacity of a network.

The method of measuring performance and capacity of a network includes monitoring network activity using an application programming interfaces monitoring system with a web services definition language file and at least one probe. The web services definition language file provides instructions to a probe control system in the application programming interfaces monitoring system and the probe control system providing regular expressions to the at least one probe. Then, performance data is collected using the at least one probe. The performance data includes a date stamp and a collection of performance information. Next, using the at least one probe, performance data measurements are transmitted between the network and the application programming interfaces monitoring system. The application programming interfaces monitoring system stores the performance data measurements in a database of performance data monitored and analyzes the performance data measurements to determine performance and capacity of the network. After that, the application programming interfaces monitoring system reports information on performance and capacity of the network to a network operations center dashboard.

The apparatus for measuring performance and capacity of a network includes a web services definition language file and at least one probe to collect performance data from the network and transmit performance data measurements to an application programming interfaces monitoring system. The application programming interfaces monitoring system being operatively connected to the web services definition language file and the at least one probe. The application programming interfaces monitoring system including a probe control system, a database of performance data monitored to store performance data measurements, and an alarm and report generator to analyze performance data measurements. The apparatus further includes a network operations center dashboard for reporting performance and capacity of the network from the alarm and report generator. The at least one probe receives probe control messages from the probe control system, and the at least one probe receives performance data, including a time stamp and performance information, from a network switch and a load balancer. Then, the at least one probe transmits performance data measurements to the database of performance data monitored. After that, the database of performance data monitored transmits performance data measurements to the alarm and report generator within the application programming interfaces monitoring system, and the alarm and report generator analyzes performance measurements to determine performance and capacity of the network and generates alarms and reports.

The computer readable medium for measuring performance and capacity of a network including instructions executable by a computing device that, when applied to the computing device, causes the device to monitor activity of a network. The device uses an application programming interfaces monitoring system probe control system that receives a web services definition language file and transmits performance control messages to at least one probe. The application programming interfaces monitoring system further collects performance data from a network using the at least one probe. The performance data collected includes a time stamp with a request time, a response time, and performance information from a network switch and a load balancing device. Then, the performance data measurements are transmitted from the at least one probe to the application interfaces monitoring system for performance data identified by probe control messages. The performance data measurements are stored in a database of performance data monitored and analyzed to determine performance and capacity of the network in an alarm and report generator. After that, the analyzed performance data measurements are used to report performance and capacity of the network to a network operations center dashboard.

Other objects and features of the present invention will become apparent from the following detailed description considered in conjunction with the accompanying drawings. It is to be understood, however, that the drawings are designed as an illustration only and not as a definition of the limits of the invention.

DETAILED DESCRIPTION OF THE INVENTION

Figure 1:
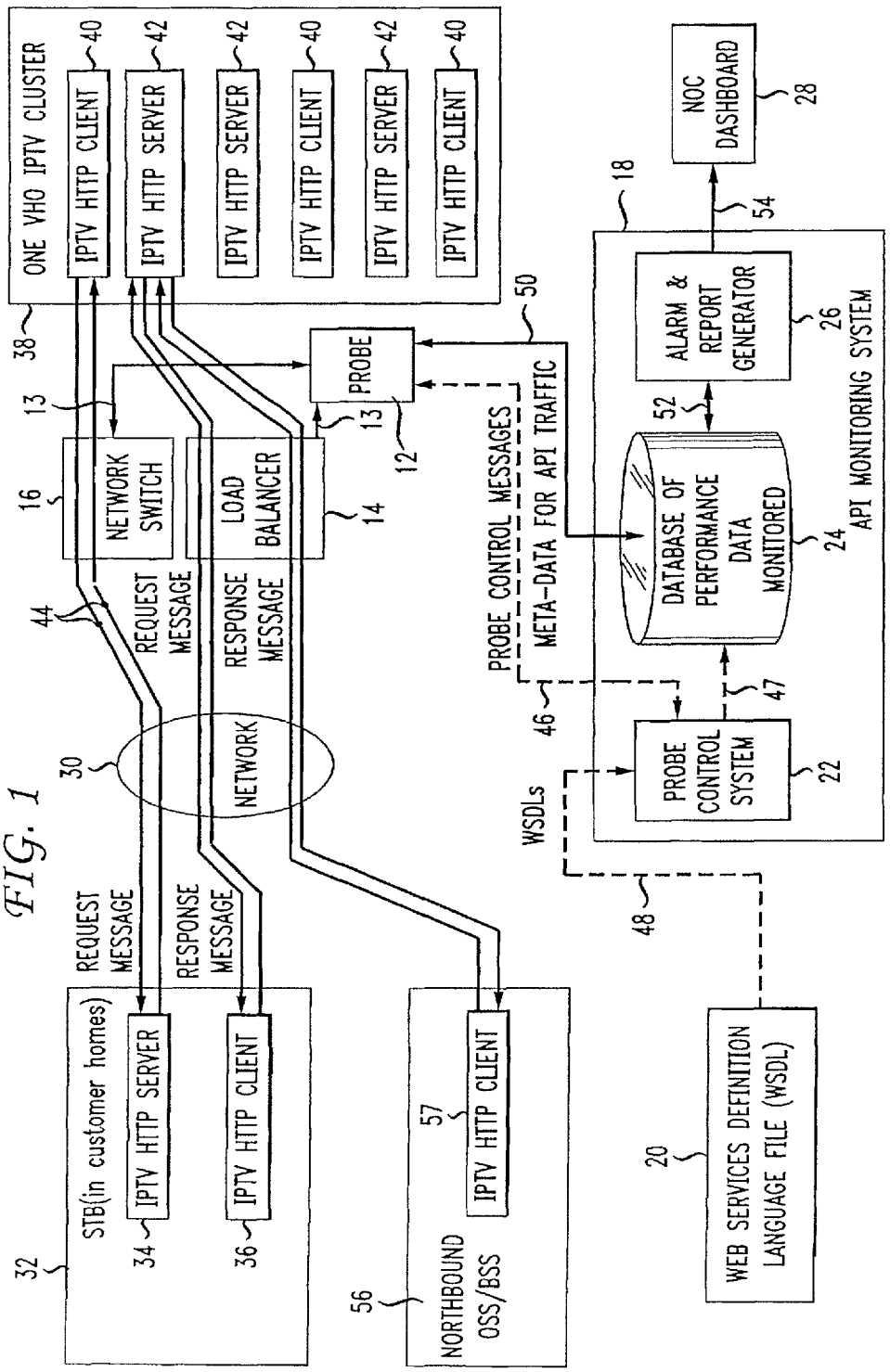
FIG. 1 refers to a first embodiment of the present invention using HTTP probes with an Internet Protocol Television (IPTV).

The present invention provides a method for optimizing the performance and capacity of a SOA by monitoring network activity using real-time monitoring and near real-time automated analysis of the delivered response time performance of selected API-based controls over the service paths.

The objective is to provide reports on the near real-time performance of selected service path Control APIs, such that adverse conditions that are causing impairments to, or likely to impair, the service path are recognized in near real-time. The present invention focuses on response times required to support end-to-end integrated management of a large network of autonomous devices. Furthermore, because response times are inherently defined from the perspective of users of the API that are external to the API service provider, it should be assumed that no system can meet the requirements associated with providing its own response time measures.

By watching the machine to machine response times, the invention performs automated passive monitoring and observation to determine maximum performance and capacity of the system. To monitor the machine-to-machine response times, the present invention uses a web services definition language (WSDL) file and a probe. WSDL is an XML-formatted language used to describe web services capabilities as collections of communication endpoints capable of exchanging messages. The WSDL file may include, but is not limited to the following elements: (1) data definitions; (2) messages, such as request message details and response message details; (3) ports with request and response pairings; (4) bindings including message transport methods; and (5) services with the address of service availability. The WDSL file enables automated monitoring and uses the WSDL file elements to automate the configuration of regular expressions for the probe to use with the collection of performance data. For example, the regular expressions may include request messages and response messages.

In the present instance, the WSDL file data structure used unambiguously describes APIs provided by each element of a SOA to mechanically compute regular expressions required by a system that monitors APIs as part of a service path monitoring system, also referred to as an API monitoring system. The regular expressions provide a concise and flexible means for identifying strings of text of interest, such as particular characters, words, or patterns of characters. The regular expressions are written in a formal language that can be interpreted by a regular expression processor, a program that either serves as a parser generator or examines text and identifies parts that match the provided specification. In addition, by monitoring performance data on the current API volume and performance in real-time, one or more remedies for the condition may be readily apparent. Therefore, the current invention is expected to reduce the frequency and impact of large scale service impairments and when impairments are unavoidably experienced, the current invention will hasten the return to full service.

Figure 2:
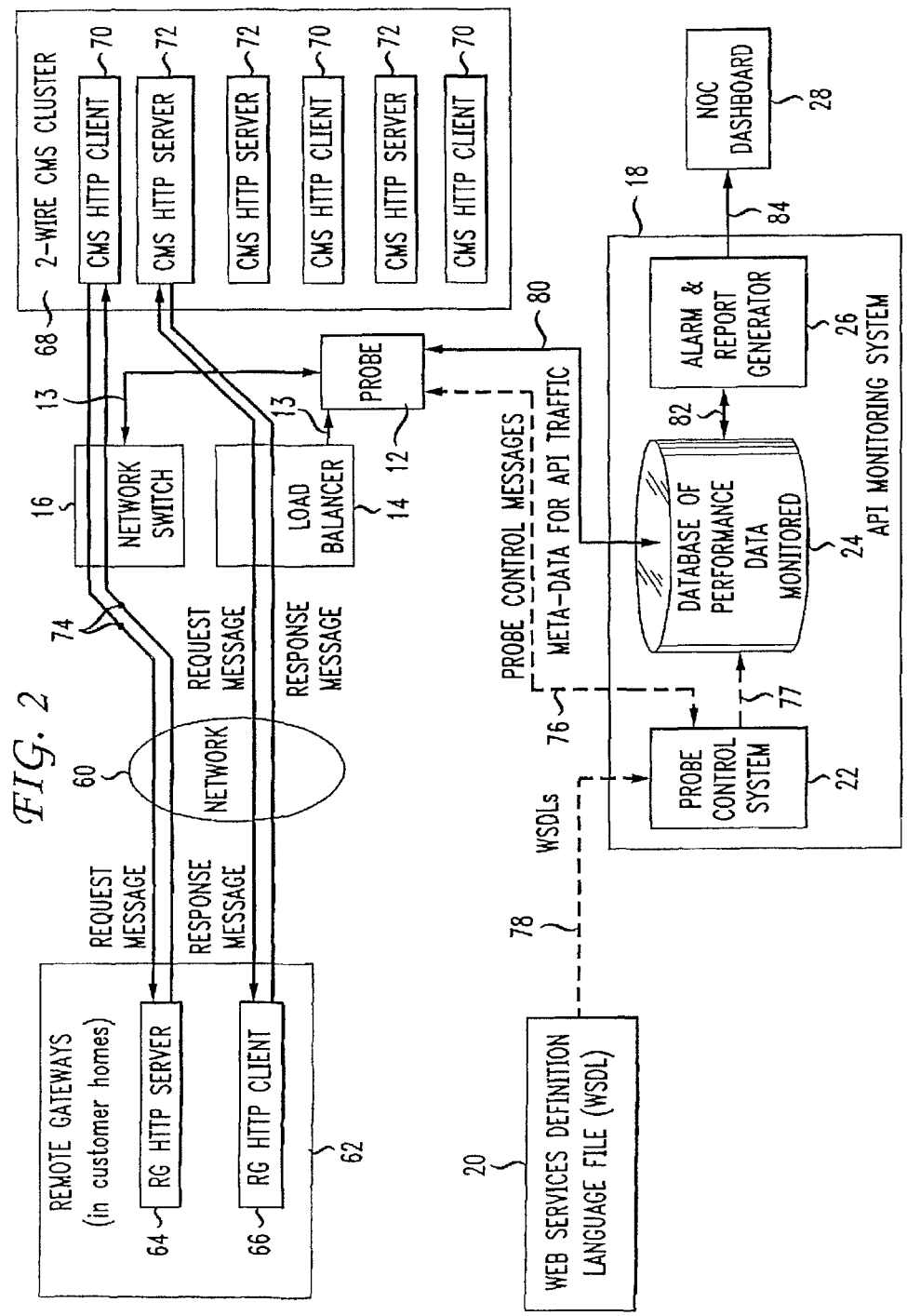
FIG. 2 refers to a second embodiment of the present invention using HTTP probes with a Content Management System (CMS).

As shown in FIGS. 1 and 2, the present invention uses at least one probe 12, a load balancer 14, a network switch 16, an API monitoring system 18, and a WSDL file 20 to monitor end-to-end performance using an Element Management System (EMS). An EMS is a system that provides control of network elements in a Service Path network. The at least one probe 12 observes and creates a database of performance data monitored 24 based on observations of network performance data 13. In the present invention, it is advantageous to use the Simple Object Access Protocol (SOAP) owing to a common convention wherein such protocols are precisely defined by a WSDL file. The at least one probe 12 is configured through the API monitoring system that receives the WSDL files 20 containing instructions for obtaining relevant volume and response times from performance data 13, which includes metadata to enable the automated monitoring of end-to-end performance on a network.

The at least one probe 12 collects performance information from the load balancer 14 and the network switch 16, and the at least one probe 12 transmits all relevant performance data measurements 50, 80 to the API monitoring system 18 for compilation of the performance data 13 in the database of performance data monitored 24. The load balancer 14 is a dedicated program or a piece of hardware, such as a multi-layer switch that spreads work between two or more network links or resources to optimize resource utilization, throughput, or response time. When used with computer clusters 38, 68 the load balancer 14 mediates communication within the clusters 38, 68. The network switch 16 is a computer networking device that is used to connect network segments.

The at least one probe 12 may be configured to operate in one of several modes: (1) a proxy mode; (2) a passive observation mode; and (3) a function-cooperative mode. In the proxy mode, the load balancer 14 is a commercial load balancer that provides performance information 44, 74 that includes mirrored copies of performance information to the at least one probe 12. When the at least one probe 12 is configured to operate in a passive observation mode, pass-through appliance record transmissions are matched to configured patterns of network performance data 13. In a function-cooperative mode, a SOAP server with internal software is used to provide performance data 13 from performance information 44, 74 to the at least one probe 12.

The API monitoring system 18 may contain a probe control system 22, the database of performance data monitored 24, and an alarm and report generator 26. The alarm and report generator 26 is responsible for providing the network operations center dashboard 28 with performance and capacity reports and resulting alarms. The reports that the alarm and report generator 26 may provide include, but are not limited to, reports on end-to-end service response time; service usage; component service errors; end-to-end requestor load; and end-to-end business function performance data by combining performance data measurements 50, 80 from one or more service provider sessions.

Referring to FIG. 1, a first embodiment of the present invention is provided with a network 30 including set top boxes 32 running on service path control servers and clients. More particularly, the network 30 of the first embodiment includes an IPTV HTTP (Hypertext Transfer Protocol) Server 34 and an IPTV HTTP Client 36 and a One VHO (Video Headend Office) IPTV Cluster 38 with at least one IPTV HTTP Client 40 and at least one IPTV HTTP Server 42. At least one of the set top boxes 32 includes the IPTV HTTP Server 34 and the IPTV HTTP Client 36, while the One VHO IPTV Cluster 38 includes IPTV HTTP Clients 40 and IPTV HTTP Servers 42. The IPTV HTTP Server 34 and IPTV HTTP Client 36 of the set top box 32 connect to the at least one IPTV HTTP Client 40 and at least one IPTV HTTP Server 42 of the One VHO IPTV Cluster 38 through the network 30 and the network switch 16. The network switch 16 then provides performance information 44, including a copy of each performance message sent between the set top boxes 32 and the One VHO IPTV Cluster 38, to the at least one probe 12.

The at least one probe 12 is operatively connected 46 to the probe control system 22. The probe control system 22 analyzes the WSDL files 20 provided 48 and computes one or more probe control messages 46 that are transmitted and loaded into the probe 12. The probe 12 uses the control messages 46 that include the regular expressions to select performance data 13 of the APIs that are relevant to the service path. The probe 12 reports, using the probe control messages 46, the status on its implementation of such regular expressions to the probe control system 22, enabling the probe control system 22 to always be in control of the current state of the at least one probe 12. The probe control messages 46 also flow 47 between the probe control system 22 and the database of performance data monitored 24.

All performance data 13 provided to the at least one probe 12 by the network switch 16 and the load balancer 14 are monitored using the regular expressions provided by the probe control system 22. Then, the at least one probe 12 generates performance data measurements 50 including the volume and performance of each of the configured APIs to a database of performance data monitored 24. The database of performance data monitored 24 retains the performance data measurements 50 and based on thresholds also stored in the database of performance data monitored 24, provides alarms and reports 52 to an alarm and report generator 26. The alarm and report generator 26 also controls the thresholds stored in the database of performance data monitored 24 that cause selected alarms to be reported, and the alarm and report generator 26 portion of the API monitoring system 18 will transmit any alarms and/or reports 54 to the network operations center dashboard 28.

It is important to note that the particular performance data 13 that the probe 12 analyzes includes performance data from a multiplicity of sources, involving a multiplicity of network elements. FIG. 1 shows an Operational Support System (Northbound OSS), and a Business Support System (BSS) 56, which includes an IPTV HTTP Client 57, as well as in-home set-top boxes 32, each having performance data 13 copied to the probe 12 at either the Network Switch 16 and/or the load balancer 14. Each of these has a corresponding set of WSDL files 20 that are each loaded into the probe control system 22, enabling the probe 12 to selectively collect performance data 13 on the service path from each of these sources.

FIG. 2 shows a second embodiment of the present invention with a network 60 including a Remote Gateway (RG) 62 running on service path control servers and clients. More particularly, the network 60 of the second embodiment includes a RG HTTP Server 64 and a Database of performance data monitored HTTP Client 66 and a 2-Wire CMS Cluster 68 with at least one CMS HTTP Client 70 and at least one CMS HTTP Server 72. The CMS HTTP Server 64 and the CMS HTTP Client 66 of the Remote Gateway 62 connect to the at least one CMS HTTP Client 70 and the at least one CMS HTTP Server 72 of the 2-Wire CMS Cluster 68 through the network 60 and the network switch 16. The network switch 16 then provides performance information 74, including a copy of each performance message sent between the Remote Gateways 62 and the 2-Wire CMS Cluster 68, to the at least one probe 12.

The at least one probe 12 is operatively connected 76 to the probe control system 22. The probe control system 22 analyzes the WSDL files 20 provided 78 and computes one or more probe control messages 76 that are transmitted and loaded into the probe 12. The probe 12 uses the control messages 76 that include the regular expressions to select performance data 13 of the APIs that are relevant to the service path. The probe 12 reports, using the probe control messages 76, the status on its implementation of such regular expressions to the probe control system 22, enabling the probe control system 22 to always be in control of the current state of the probes 12. The probe control messages 76 also flow 77 between the probe control system and the database of performance data monitored 24.

All performance data 13 provided to the at least one probe 12 by the network switch 16 and the load balancer 14 are monitored using the regular expressions provided by the probe control system 22. Then, the at least one probe 12 generates performance data measurements 80 including the volume and performance of each of the configured APIs to a database of performance data monitored 24. The database of performance data monitored 24 retains the performance data measurements 80 and based on thresholds also stored in the database of performance data monitored 24, provides alarms and reports 82 to an alarm and report generator 26. The alarm and report generator 26 also controls the thresholds stored in the database of performance data monitored 24 that cause selected alarms to be reported, and the Alarm and Report Generator 26 portion of the API monitoring system 18 will transmit any alarms and/or reports 84 to the network operations center dashboard 28.

A benefit of having automated and integrated monitoring of end-to-end volume and response times delivered by the present invention are that end-to-end systems and network capacity can be better optimized, reducing the overall capital and labor required to deliver services. In addition, this invention is the first to use WSDL files 20 and the at least one probe 12 to collect performance data 13 and use the performance data measurements 50, 80 to monitor and detect end-to-end performance and capacity, with automated technology, instead of using manual decoding.

It will be appreciated that the present invention has been described herein with reference to certain preferred or exemplary embodiments. The preferred or exemplary embodiments described herein may be modified, changed, added to or deviated from without departing from the intent, spirit and scope of the present invention, and it is intended that all such additions, modifications, amendment and/or deviations be included within the scope of the following claims.

What is claimed is:

1. A method of measuring performance and capacity of a network, the method comprising:
   executing, by a probe control system, instructions included in a web services definition language file to generate a control message that includes regular expressions associated with controlling a state of a probe in monitoring network elements of the network;
   transmitting, by the probe control system, the control message to the probe;
   receiving, by a monitoring system, performance data associated with the network elements from the probe, the performance data collected by the probe based on the regular expressions included in the control message;
   analyzing, by the monitoring system, the performance data in order to determine information associated with the performance and capacity of the network; and
   providing, by the monitoring system, the determined information associated with the performance and capacity of the network.

2. The method of claim 1, wherein the network links a service path control server and a service path control client to an element management system server and an element management system client.

3. The method of claim 2, wherein the service path control server and the service path control client are included in a set top box.

4. The method of claim 3, wherein the element management system server and the element management system client are included in a video head end cluster.

5. The method of claim 2, wherein the service path control server and the service path control client are included in a remote gateway.

6. The method of claim 5, wherein the element management system server and the element management system client are included in a content management system cluster.

7. The method of claim 1, wherein the probe operates in a proxy mode having a load balancer provide mirrored copies of the performance data to the probe.

8. The method of claim 1, wherein the probe operates in a passive observation mode to match a configured pattern of network performance data to pass-through appliance record transmission performance information included in the performance data, the monitoring system receiving performance data matching the configured pattern of network performance data from the probe.

9. The method of claim 1, wherein the probe operates in a function-cooperative mode to extract performance data measurements from the selected performance data, the monitoring system receiving the performance data measurements from the probe.

10. The method of claim 1, wherein the performance data collected by probe is from one or more of a load balancer and a network switch.

11. A system to measure performance and capacity of a network, the system comprising:
   a computing device; and
   computer readable medium to store instructions that, when executed by the computing device, cause the computing device to perform operations comprising:
   executing instructions included in a web services definition language file to generate a control message that includes regular expressions associated with controlling a state of a probe in monitoring network elements of the network;
   transmitting the control message to the probe;
   receiving performance data associated with the network elements from the probe, the performance data collected by the probe based on the regular expressions included in the control message;
   analyzing the performance data in order to determine information associated with the performance and capacity of the network; and
   providing the determined information associated with the performance and capacity of the network to a network.

12. The system of claim 11, wherein the network links a service path control server and a service path control client to an element management system server and an element management system client.

13. The system of claim 12, wherein the service path control server and the service path control client are included in a set top box.

14. The system of claim 13, wherein the element management system server and the element management system client are included in a video head end cluster.

15. The system of claim 12, wherein the service path control server and the service path control client are included in a remote gateway.

16. The system of claim 15, wherein the element management system server and the element management system client are included in a content management system cluster.

17. The system of claim 11, wherein the probe operates in a proxy mode having a load balancer provide mirrored copies of the performance data to the probe.

18. The system of claim 11, wherein the probe operates in a passive observation mode to match a configured pattern of network performance data to pass-through appliance record transmission performance information included in the performance data, the operations further comprising receiving performance data matching the configured pattern of network performance data from the probe.

19. The system of claim 11, wherein the probe operates in a function-cooperative mode to extract performance data measurements from the selected performance data the operations further comprising receiving the performance data measurements from the probe.

20. A computer readable device storing instructions that, when executed by a computing device, cause the computing device to perform operations comprising:
   executing instructions included in a web services definition language file to generate a control message that includes regular expressions associated with controlling a state of a probe in monitoring network elements of the network;
   transmitting the control message to the probe;
   receiving performance data associated with the network elements from the probe, the performance data collected by the probe based on the regular expressions included in the control message;
   analyzing the performance data in order to determine information associated with the performance and capacity of the network; and
   providing the determined information associated with the performance and capacity of the network to a network.

* * * * *